United States Patent [19]

Lehmann

[11] Patent Number: 4,767,136
[45] Date of Patent: Aug. 30, 1988

[54] TIGHT COUPLING DEVICE FOR TWO RIGID, FIXED PIPES

[75] Inventor: Jean Lehmann, Antony, France

[73] Assignee: Cogema, Compagnie Generale des Matieres Nucleaires, Velizy Villacoublay, France

[21] Appl. No.: 63,435

[22] Filed: Jun. 18, 1987

[30] Foreign Application Priority Data

Jun. 18, 1986 [FR] France ................................. 86 08803

[51] Int. Cl.⁴ .............................................. F16L 15/02
[52] U.S. Cl. ....................................... 285/32; 285/39; 285/325; 285/364
[58] Field of Search ...................... 285/32, 31, 39, 325, 285/327, 364

[56] References Cited

U.S. PATENT DOCUMENTS

| | | | |
|---|---|---|---|
| 2,590,688 | 3/1952 | Crain | 285/32 X |
| 4,609,211 | 9/1986 | Abbes et al. | 285/325 |

FOREIGN PATENT DOCUMENTS

| | | | |
|---|---|---|---|
| 0124430 | 11/1984 | European Pat. Off. . | |
| 929404 | 6/1955 | Fed. Rep. of Germany | 285/32 |
| 3146305 | 5/1983 | Fed. Rep. of Germany . | |
| 1253963 | 1/1961 | France . | |
| 1457568 | 9/1966 | France . | |
| 1536180 | 8/1968 | France | 285/31 |
| 873886 | 8/1961 | United Kingdom | 285/32 |

Primary Examiner—Thomas F. Callaghan
Attorney, Agent, or Firm—Kerkam, Stowell, Kondracki & Clarke

[57] ABSTRACT

The device for coupling two pipes comprises a variable length assembly formed from two tubular parts, whereof the internal diameter corresponds to the internal diameter of the pipes. The tight coupling of this assembly to the ends of the pipes is brought about by compressing O-rings between a planar surface and a spherical surface by means of two nuts. The two tubular parts are then tightly joined by actuating a nut compressing a third O-ring.

10 Claims, 5 Drawing Sheets

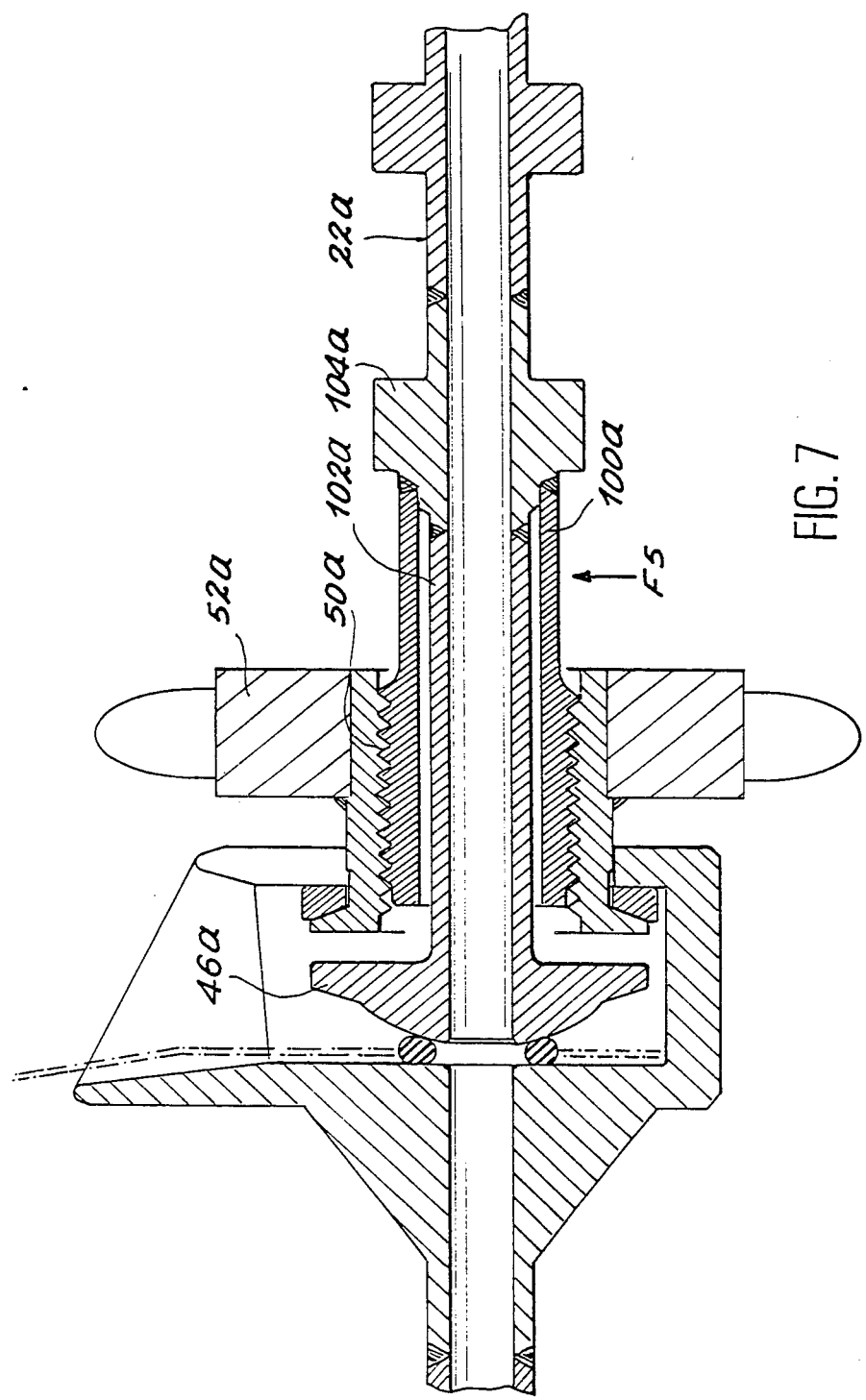

TIGHT COUPLING DEVICE FOR TWO RIGID, FIXED PIPES

BACKGROUND OF THE INVENTION

The present invention relates to a device for bringing about the tight coupling of two rigid, fixed pipes, particularly when the axes of said pipes can have alignment deficiencies resulting from an angular and/or lateral displacement between said axes.

In a large number of industrial installations, fixed equipments are interconncted by rigid pipes carrying fluids of different types. When such an installation is installed, it is rarely possible to reciprocally set up the equipment in such a way that the axes of the ends of the pipes connecting them are aligned. The problem is made more complicated as the number of pipes increases.

In addition, certain equipment must be replaced after a certain period of use. Bearing in mind the manufacturing tolerances of such equipment, even if two pipes were initially aligned, said alignment normally no longer exists after such a replacement.

In numerous cases, the sealing of the coupling between the pipes makes it necessary to use coupling devices taking into account the alignment deficiencies existing between the pipes.

One known solution for solving this problem consists of using a flexible compensator, whose ends are fixed to flanges, which are tightly connected to fixed flanges at the ends of the pipes. For this purpose, gaskets are generally compressed between adjacent flanges or clamps, e.g. using tie rods passing through them. Although this solution makes it possible to solve the problem, of the tight coupling of two unaligned pipes, it suffers from certain disadvantages preventing it use in other cases.

Thus, the presence of a flexible compensator between the two pipes produces at this location a retention zone. When the fluid transported is corrosive, in a relatively short time said retention zone may lead to a break in the seal of the compensator, under the effect of the corrosive action of the fluid stagnating in this zone. This retention zone can also lead to disturbances in the circulation of a liquid, such as water hammer, when air or another gas is trapped in said zone during liquid circulation stoppage.

Situations of this type occur in certain sectors of the chemical industry and in the nuclear industry.

To illustrate the latter case, reference is made to installations for the processing of irradiated nuclear fuels, in which the different equipments are generally located in tight confinement cells separated by walls traversed by pipes in which circulate normally corrosive fluids.

In the nuclear industry, the aforementioned problems are made worse because the coupling of the pipes, particularly during the replacement of one of the equipments, can only take place remotely using remote manipulators or similar handling equipment.

The invention relates to a novel device for the tight coupling of rigid, fixed pipes making it possible to compensate any alignment defects between said pipes, which does not have the disadvantages of flexible or bellows compensators referred to hereinbefore and which can be advantageously installed and removed remotely using standard handling equipment.

SUMMARY OF THE INVENTION

The present invention therefore relates to a device for the tight coupling of two rigid, fixed pipes, whereof the axes can suffer from alignment deficiencies, wherein it comprises two first flanges integral with the ends of said pipes, each of these flanges having an end surface and a bearing surface oriented in opposite directions with respect to said end surface; two coaxial tubular parts, one cylindrical end of a first of these parts being slidingly received in a threaded end of the second part, each of these parts having at its opposite end a second flange having an end surface which can be positioned facing the end surface of one of the first flanges, one of the end surfaces facing the first and second flanges being a spherical surface and the other surface being planar; two first O-rings placed between the facing end surfaces of the first and second flanges; retaining nuts for the O-rings screwed onto two threads respectively formed on said parts, in the vicinity of the second flange, each nut having a bearing surface able to come into contact with the bearing surface of the first flange; a tight coupling nut between said part and screwed onto the threaded end of the second part; and a third O-ring, placed around the cylindrical end of the first part, between two facing conical surfaces respectively formed at the end of the second part and on the coupling nut, the distance between said conical surfaces increasing radially inwards.

In such a device, the use of O-rings placed between two flanges having respectively a spherical surface and a planar surface makes it possible to ensure the sealing between each of the tubular parts and the corresponding pipe, no matter what the axial and/or lateral displacement existing between the axes of the pipes. The seal between the tubular parts is brought about by the third O-ring, which is in contact both with the outer surface of one of the parts, the end of the other part and the coupling nut.

Moreover, the use of two coaxial tubular parts makes it possible to reduce to a substantially negligible volume the retention zone and thus eliminate the disadvantages inherent in the flexible compensators normally used in such a case.

The locking and unlocking of the different parts of the coupling device are brought about by nuts, whose rotation can easily be remotely controlled, e.g. by shaping these nuts like capstans.

When the coupling device has to be dismantled after a certain period of operation, the coupling nut ensuring the locking of the third O-ring may have siezed up. In such a situation, it would not be possible to slide the two tubular parts with respect to one another in order to shorten the coupling device before dismantling it.

Advantageously, this disadvantage is eliminated by providing on the first part a threaded portion adjacent to its cylindrical end, an unlocking nut for said parts being screwed onto said threaded portion and has a member which can bear on an abutment surface formed on the coupling nut in order to displace the latter and the second part towards the said opposite end of the first part.

Preferably, a driving sleeve is then mounted so as to freely rotate on the first part and cooperate with the unlocking nut by rotary means.

According to a preferred embodiment of the invention, means are provided for preventing any relative rotation between the two tubular parts. In this embodiment, each of the tubular parts has at least one portion permitting its immobilization in rotation by an appropriate tool. This further improves the remote handling of the device.

When the device has been used for a certain period of time, it may also prove to be impossible to unlock the lock nuts of the joints. Bearing in mind the special structure of this device, its dismantling would then be impossible without damaging the ends of the pipes. To eliminate this disadvantage, each of the parts advantageously has in the vicinity of the second flange an internal tubular portion carrying the latter and an external tubular portion on which is formed the said thread, said two tubular portions being interconnected at a location further from the second flange than from the lock nut.

Under conditions like those described herein before, this configuration makes it possible ensure the dismantling of the coupling device by the simultaneous cutting of the internal and external tubular portions of each of the parts. The coupling device is then freed from the pipes without damaging the latter.

Preferably and to further facilitate the remote handling of the device, the first flanges are shaped like cradles on which the end surface and bearing surface face one another.

Advantageously, the O-rings are metal joints, the remote handling of the end joints being made easier by fitting them in handling plates.

BRIEF DESCRIPTION OF THE DRAWINGS

The invention is described in greater detail hereinafter relative to non-limitative embodiments and the attached drawings, wherein show:

FIG. 7 a larger scale, longitudinal sectional view illustrating a constructional variant of the ends of the device according to the invention making it possible to release said device in the case of seizing.

BRIEF DESCRIPTION OF THE PREFERRED EMBODIMENTS

Figure 1:
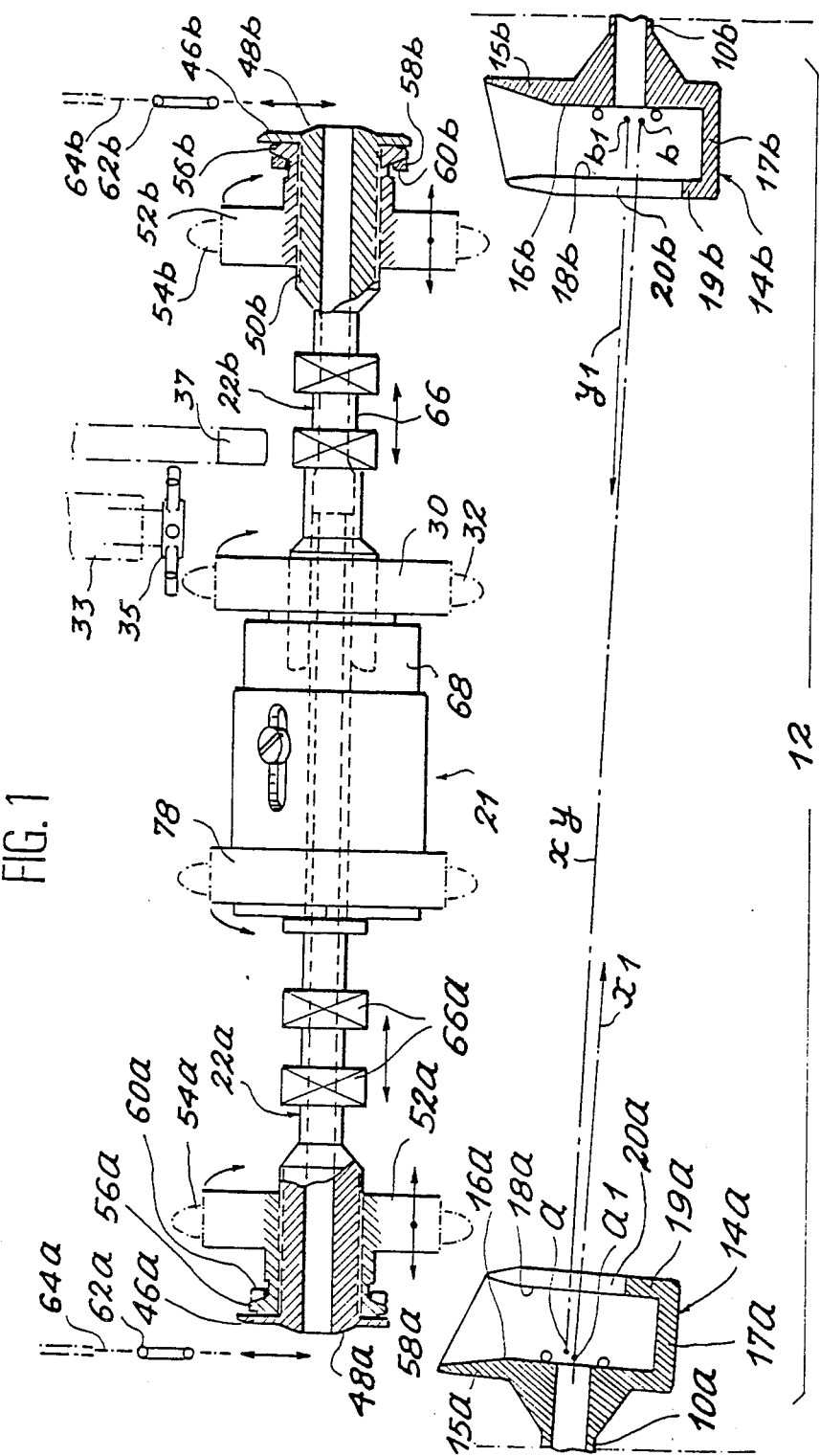
FIG. 1, diagrammatically the installation of a tight coupling device according to the invention between the ends of two pipes having an alignment deficiency.

FIG. 1 shows the ends of two pipes 10a and 10b, which have to be tightly coupled. As is very diagrammatically shown, compared with the ideal theoretical positions indicated at a and b, the centers $a_1$ and $b_1$ of the ends of pipes 10a and 10b are spatially displaced by a certain distance. In the same way, compared with the common theoretical axis thereof indicated at x, y the real axes $x_1$ and $y_1$ of each of the pipes 10a, 10b are angularly displaced. In practice, the distance separating points $a_1$ and $b_1$ from theoretical point a and b can be 6 mm and the angular displacement between each of the axes $x_1$ and $y_1$ and the theoretical axis $x_y$ can reach 1°.

According to the invention, the tight coupling between pipes 10a, 10b having such displacements is brought about by means of a coupling device designated by the general reference 12. Device 12 firstly comprises, at the end of each of the pipes 10a, 10b, a cradle-shaped flange 14a and 14b. Only flange 14a will be described in greater detail. Flange 14b is identical to flange 14a and its components are designated by the same references, followed by b instead of a.

Cradle-shaped flange 14a comprises a portion 15a forming the actual flange fixed to the end of pipe 10a. Said portion 15a forming the flange has an end surface 16a through which issues pipe 10a. Flange 14a is extended beyond surface 16a by a cradle-shaped portion 17a and has in section the shape of a U open towards the top. At its end, portion 17a is extended by a plate 19a having a planar bearing surface 18a parallel to surface 16a and facing the latter. In the extension of pipe 10a, plate 19a also has a notch 20a which is open in the upwards direction.

Coupling device 12 according to the invention also comprises a variable length, detachable tubular assembly 21 mainly constituted by two coaxial tubular parts 22a, 22b.

Figure 2:
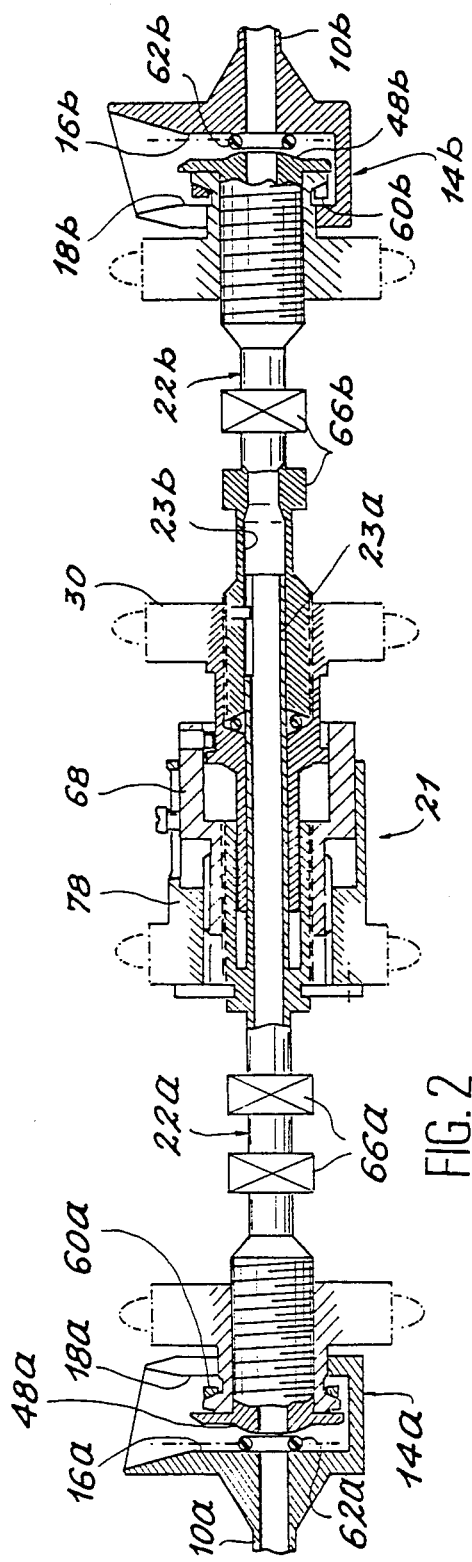
FIG. 2, a view comparable to FIG. 1 illustrating the position occupied by the different elements of the coupling device when the latter has been positioned between the end of the pipes.
Figure 4:
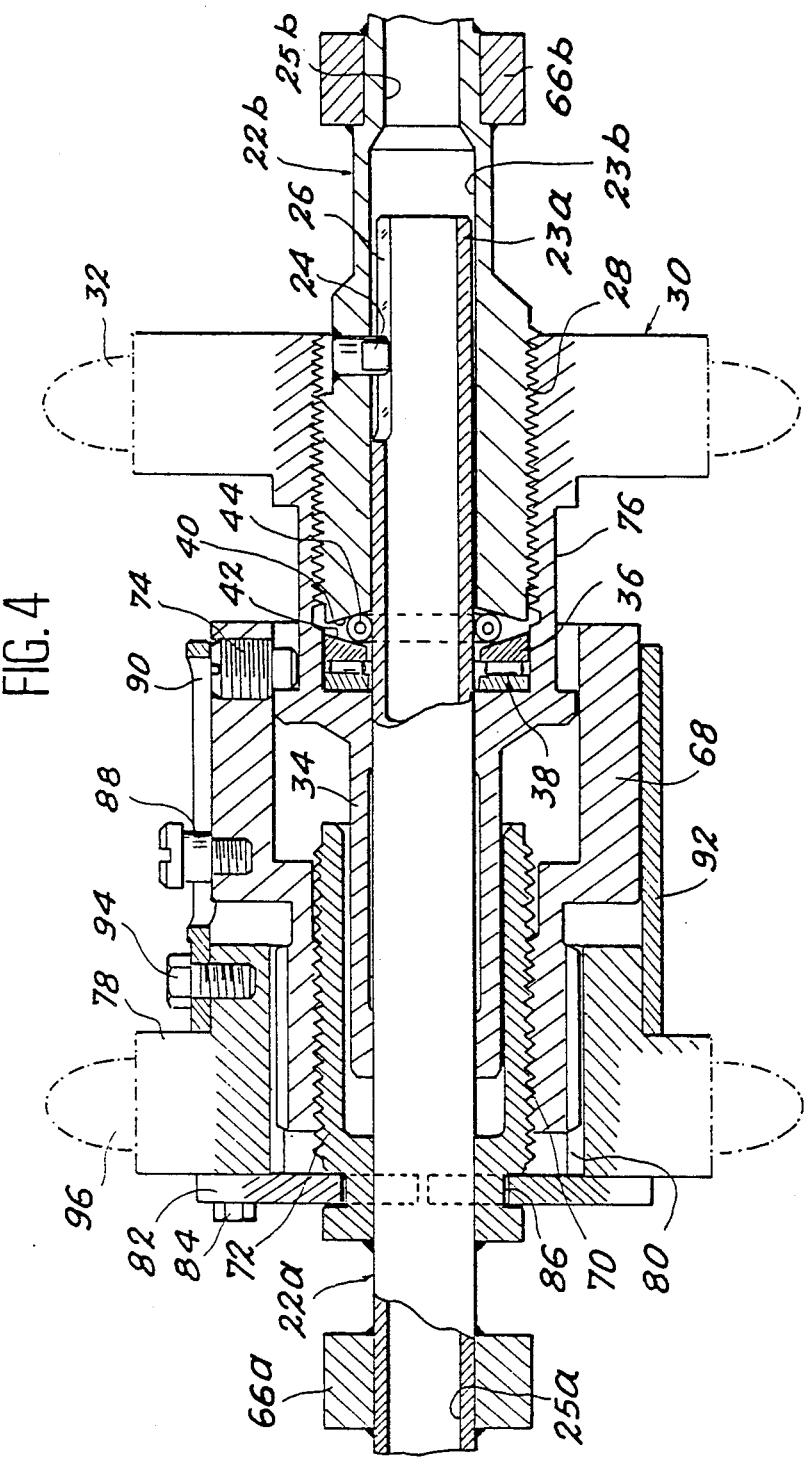
FIG. 4, a longitudinal sectional view on a larger scale of the central portion of the coupling device of FIGS. 1 to 3.

As can best be seen from FIGS. 2 and 4, one cylindrical end 23a of part 22a slidingly penetrates one larger diameter end 23b of the bore formed in part 22b. Ouside said end 23b, bores 25a and 25b formed in parts 22a and 22b have a uniform diameter equal to the internal diameter of the pipes 10a, 10b to be connected. Thus, substantially no retention zone is created.

In the represented embodiment, parts 22a, 22b have their reciprocal displacement limited by means of a lug 24 fixed to tubular part 22b and projecting radially inwards into the larger diameter end 23b of bore 25b. Lug 24 penetrates a longitudinal slot 26 formed in the cylindrical end 23a of tubular part 22a.

At its end in which is received the tubular end 23a of part 22a, part 22b has on its outer surface a thread 28, on which is screwed a coupling nut 30. This nut 30 is castellated on a portion 32 of its outer surface, so as to form a capstan, whereof the rotation can be remotely controlled, e.g. with a tool 33 shown in FIG. 1. This tool comprises a rotary mandrel 35, whose axis is perpendicular to that of assembly 21 and which has fingers meshing in the castellated portion 32 of nut 30, in order to control the rotation thereof.

Nut 30 is extended beyond the end of part 22b in order to form a tubular portion 34, whose inner surface has end bearing surfaces which cooperate without clearance with the cylindrical outer surface of end 23a of a part 22a. This cooperation ensures a perfect alignment of the axes of parts 22a and 22b.

The planar end face of tubular portion 34 turned towards the end of part 22b serves as a bearing support for a trapezoidal section annular part 36 via a roller bearing 38. End face 40 of part 22b, as well as face 42 of part 36 facing said end face have truncated cone shapes, such that the distance separating the two faces increases radially inwards.

An O-ring 44 is placed between surfaces 40, 42, so as to be simultaneously in contact with these two surfaces and with the outer cylindrical surface of end 23a of tubular part 22a. Preferably, O-ring or joint 44 is an elastic metal joint, such as the Helicoflex joint marketed by Cefilac.

In the arrangement described hereinbefore, the locking of nut 30 has the effect of compressing O-ring 44 between surfaces 40 and 42. By reaction, bearing in mind the conical shape of the surfaces, O-ring 44 is also applied to the outer surface of cylindrical end 23a of part 22a. Following the locking of nut 30, tubular parts 22a, 22b are consequently tightly connected.

On referring to FIG. 1, it can seen that at their opposite ends, tubular parts 22a, 22b are terminated by flanges 46a, 46b. According to an essential feature of the invention, end surface 48a, 48b of flanges 46a, 46b are spherical surface and preferably convex.

In the vicinity of flanges 46a, 46b, parts 22a, 22b comprise thicker portions provided with threads 50a, 50b on their outer surfaces. Lock nuts 52a and 52b are screwed onto these threads 50a, 50b. Like coupling nut 30, nuts 52a and 52b are castellated on a portion 54a, 54b of their outer surface. Thus, nuts 52a, 52b form capstans which can be remotely manipulated, e.g. with the aid of tool 33.

Beyond said castellated portion 54a, 54b, each of the nuts 52a, 52b is extended towards flange 46a, 46b and is terminated by a flange-like part 56a, 56b. The face of the part 56a, 56b opposite to flange 46a, 46b is spherical, preferably convex and serves as a bearing support for a complementary washer 58a, 58b. The latter has a planar bearing face 60a, 60b oriented in the opposite direction compared with the spherical end surface 48a, 48b of the corresponding flange.

As illustrated in FIG. 2, when assembly 21 is placed between the ends of pipes 10a, 10b, the spherical end surfaces 48a, 48b are positioned facing the planar end surfaces 16a, 16b. Bearing surfaces 60a, 60b then face bearing surfaces 18a, 18b.

The tight coupling device 12 according to the invention also comprises two O-rings 62a, 62b positioned between end surfaces 16a and 48a and 16b and 48b respectively. Like O-ring 44, O-rings 62a, 62b are preferably flexible metallic joints, such as Helicoflex joints, marketed by Cefilac.

In order to permit the remote handling thereof, O-ring 62a, 62b are mounted on metal plates 64a, 64b shown diagrammatically in FIG. 1.

Before assembly 21 is placed between the ends of pipes 10a, 10b, its length is adjusted by unlocking nut 30 forming a capstan and nuts 52a, 52b in the form of a capstan are actuated in order to move bearing surfaces 60a, 60b towards end surfaces 48a, 48b. This configuration is illustrated in FIG. 2, where it is possible to see that O-rings 62a and 62b are then in place.

Figure 3:
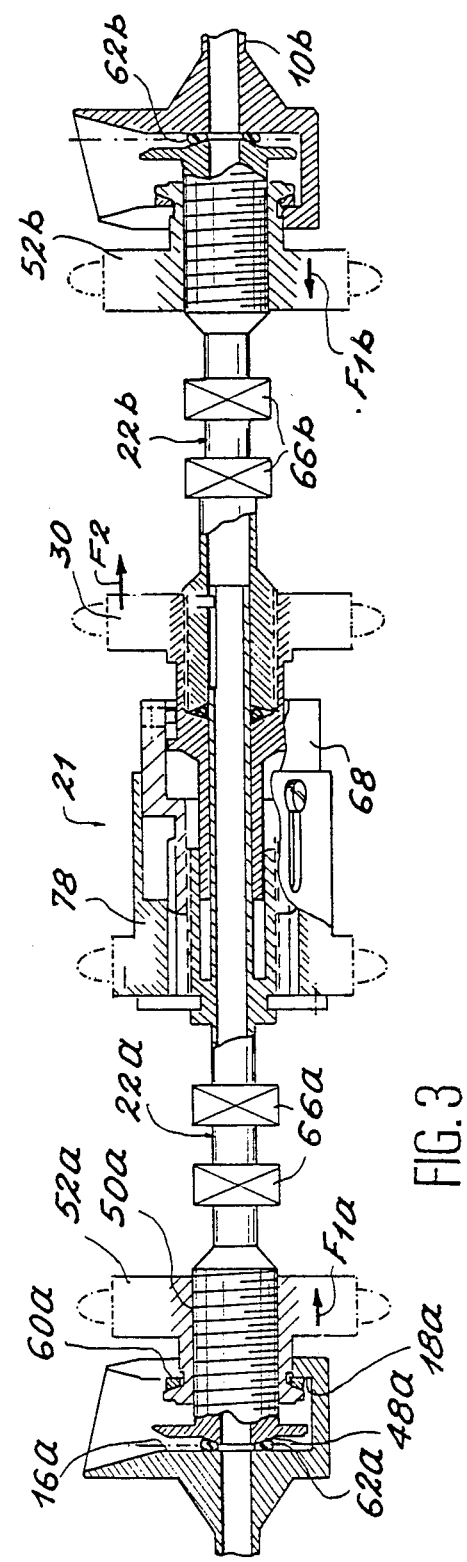
FIG. 3, the same coupling after tightening or locking.

As illustrated in FIG. 3 (arrows $F_{1a}$ and $F_{1b}$), nuts 52a, 52b are then actuated in turn, in order to compress the O-rings 62a, 62b between the end faces of the adjacent flanges.

For O-ring 62a, this result is obtained by making face 60a bear against face 18a and then by continuing to screw nut 52a onto thread 50a. By reaction, the tubular part 22a is then displaced to the left with respect to FIG. 3, which has the effect of compressing O-ring 62a between end surfaces 48a and 16a.

A similar operation is then carried out at the other end of assembly 21, in order to tightly connect tubular part 22b to pipe 10b.

According to the invention, the cooperation of O-rings 62a, 62b with the spherical end surfaces 48a, 48b of flanges 46a, 46b makes it possible to ensure the tight coupling of tubular parts 22a, 22b on pipes 10a, 10b, despite the displacements generally existing between the theoretical and real positions of the ends of these pipes and the possible angular displacement of their axes.

When the ends of assembly 21 are tightly connected to the ends of pipes 10a, 10b in the manner described hereinbefore, it is merely necessary to ensure the tight connection of tubular parts 22a, 22b.

Figure 5:
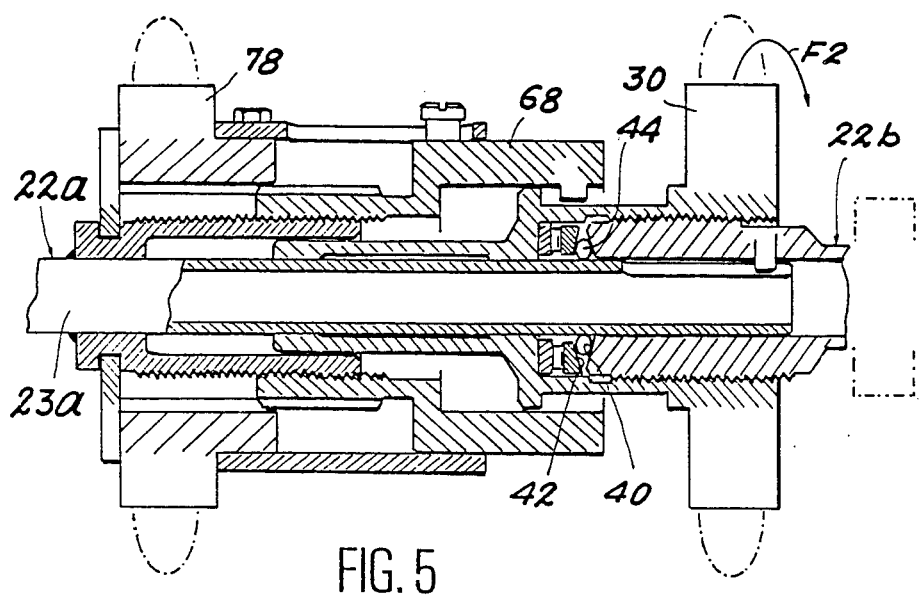
FIG. 5, a view comparable to FIG. 4 illustrating the obtaining of the the seal between the two tubular parts of the device.

According to the invention and as illustrated in FIGS. 3 and 5, this result is obtained by actuating nut 30, in order to move it to the right. Thus, O-ring 44 is compressed between surfaces 42 and 40 and, bearing in mind the truncated cone shape of the latter, against the outer cylindrical surface of end 23a of part 22a. Thus, sealing between parts 22a, 22b is ensured.

As is also illustrated by FIGS. 1 to 3, in order to prevent the rotation of tubular parts 22a, 22b during the rotation of nuts 30, 52a and 52b, each of these tubular parts preferably has portions 66a, 66b, permitting the immobilization in rotation thereof with an appropriate tool, such as the spanner 37 diagrammatically shown in FIG. 1. Portion 66a, 66b can in particular have a square or hexagonal section.

When it is wished to dismantle the coupling device 12 according to the invention, e.g. to change one of the equipments which it connects, it is normally sufficient to carry out identical operations to those performed during its fitting, but in the reverse order. Thus, the tight coupling between the two tubular parts 22a, 22b is normally released by actuating nut 30, after which the ends of the device can in turn be disengaged from the ends of the pipes by the actuation of nuts 52a, 52b.

However, when the device has been in service for several years and particularly if it has been working in a particularly corrosive medium, nut 30 frequently becomes seized on the tubular parts. In this case, it is not possible to disengage tubular parts 22a, 22b by actuating the nut.

In order to obviate this disadvantage, in the preferred embodiment of the invention shown in FIG. 1 to 6, an unlocking nut 68 is screwed onto a thread 70 (FIG. 4) formed on the outer surface of a part 72, joined by welding to the tubular end 23a of part 22a.

More specifically part 72 is welded to part 22a beyond the end of portion 34 of nut 30 and thread 70 is formed on a tubular portion of the part 72 surrounding portion 34.

The displacement of nut 68 parallel to the common axis of the parts 22a, 22b with respect to nut 30 is limited in one or other direction by a screw 74 screwed radially into part 68 and whose end penetrate a groove 76 formed on the outer surface of nut 30 between the castellated portion 32 and the tubular portion 34.

In the embodiment shown in FIG. 4, the rotation of nut 68 is controlled by a sleeve 78 arranged around nut 68. Sleeve 78 is integral in rotation with nut 60 as a result of complementary splines 80.

Moreover, sleeve 80 is axially immobilized on part 72 as a result of a two-piece washer 82 fixed to the end of sleeve 78 turned towards nut 52a, e.g. by means of screw 84. The inner peripheral edge of washer 82 penetrates a complementary groove 86 formed on the outer surface of part 72.

The relative displacement between nut 68 and sleeve 78 parallel to the common axis of parts 22a, 22b is limited by a screw 88 fixed radially in nut 68 and traversing an oblong hole 90 formed in a tubular part 92 joined to sleeve 78, e.g. my means of screw 94.

In order to ensure its rotation, sleeve 78 has a castellated external portion 96 giving it the shape of a capstan, which can be remotely actuated by means of a tool, like 33 in FIG. 1.

Figure 6:
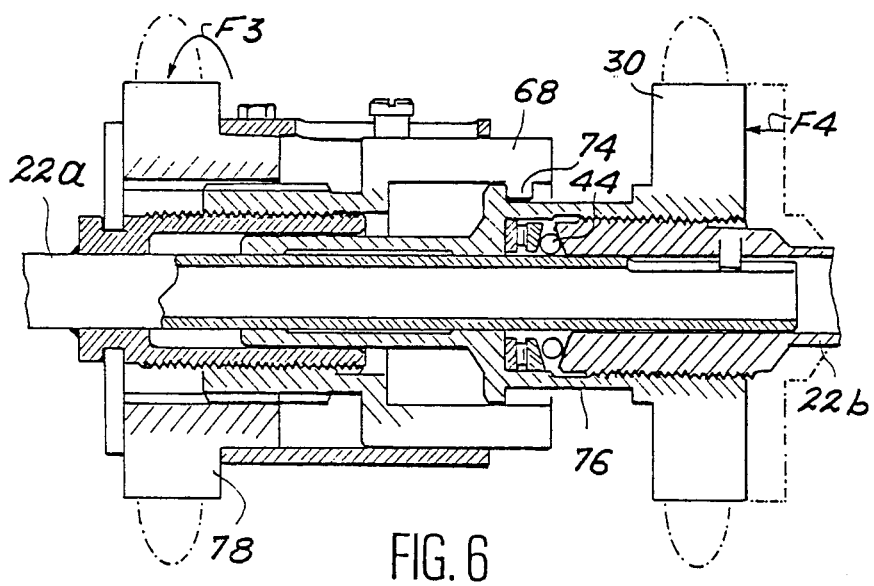
FIG. 6, a view identical to FIG. 5 illustrating the unlocking of the two tubular parts in order to shorten the device during its dismantling.

As a result of the features described hereinbefore and as is particularly illustrated in FIG. 6, if nut 30 becomes seized, it is still possible to slide the two tubular parts 22a and 22b with respect to one another in the sense of shortening the same.

Thus, by rotating sleeve 78 and consequently nut 68 in the direction of arrow $F_3$ in FIG. 6, the end of screw 74 is made to bear on the left-hand edge of groove 76 when considering this drawing. On continuing this movement, there is a leftward displacement of nut 30 and consequently tubular part 22b on which it is screwed with respect to the tubular part 22a on which the sleeve 78 is axially mobilized. The corresponding displacement, represented diagrammatically by arrow $F_4$ in FIG. 6, makes it possible to bring about the desired shortening, even in the case of nut 30 seizing.

Under the same conditions of prolonged use of the coupling device according to the invention, there can also be seizing of nuts 52a, 52b permitting the coupling of the device to the ends of the pipes. To obviate this disadvantage, FIG. 7 shows a variant of the coupling device according to the invention. This differs essentially from the previously described embodiment by the fact that in place of being directly formed on a widened portion of part 22a, 22b carrying flange 46a, 46b, thread 50a, 50b is formed on a separate portion.

This structure will now be described in greater detail with reference to FIG. 7, for the end of tubular part 22a. Obviously, an identical structure appears at the end of tubular part 22b.

At the vicinity of its end carrying flange 46a, tubular part 22a comprises an inner tubular portion 102a carrying flange 46a and an outer tubular portion 100a positioned coaxially around portion 102. These two tubular portions 100a 102a are interconnected, e.g. by being welded to a thicker portion 104a, which is axially displaced on moving away from flange 46a with respect to thread 50a and nut 52a.

Thus, between portion 104a and nut 52a, a zone is formed in which it is possible to simultaneously cut the two tubular portions 100a and 102a, as indicated by arrow $F_5$ in FIG. 7. By carrying out such cutting, it is possible to disengage the ends of the device according to the invention from the ends of the pipes. Thus, it is possible to dismantle the device without damaging the pipes.

Obviously, the invention is not limited to the embodiments described and in fact covers all variants thereof. In particular, when the fitting and dismantling of the device according to the invention take place relatively frequently, so that there is no risk of seizing, nut 68 and sleeve 78 can be eliminated and the variant described relative to FIG. 7 is unnecessary.

What is claimed is:

1. A device for the tight coupling of two rigid, fixed pipes, whereof the axes can suffer from alignment deficiencies, wherein it comprises two first flanges integral with the ends of said pipes, each of these flanges having an end surface and a bearing surface oriented in opposite directions with respect to said end surface; two coaxial tubular parts, one cylindrical end of a first of these parts being slidingly received in a threaded end of the second part, each of these parts having at its opposite end a second flange having an end surface which can be positioned facing the end surface of one of the first flanges, one of the end surfaces facing the first and second flanges being a spherical surface and the other surface being planar; two first O-rings placed between the facing end surfaces of the first and second flanges; retaining nuts for the O-rings screwed onto two threads respectively formed on said parts, in the vicinity of the second flange, each nut having a bearing surface able to come into contact with the bearing surface of the first flange; a tight coupling nut between said parts and screwed onto the threaded end of the second part; and a third O-ring, placed around the cylindrical end of the first part, between two facing conical surfaces respectively formed at the end of the second part and on the coupling nut, the distance between said conical surfaces increasing radially inwards.

2. A device according to claim 1, wherein the first part has a threaded portion adjacent to its cylindrical end, a nut for unlocking the two parts being screwed onto said threaded portion and incorporates a member which can bear on an abutment surface formed on the coupling nut in order to move the latter towards the opposite end of the first part.

3. A device according to claim 2, wherein a drive sleeve is mounted so as to rotate freely on the first part and cooperates with the unlocking nut by rotational means.

4. A device according to claim 1, wherein means are provided for preventing relative rotation between the two tubular parts.

5. A device according to claim 1, wherein each of the tubular parts has at least one portion permitting its immobilization in rotation by an appropriate tool.

6. A device according to claim 1, wherein each of the said parts has, in the vicinity of the second flange, an inner tubular portion carrying the latter and an outer tubular portion on which is formed the said thread, said two tubular portions being interconnected at a location displaced on moving away from the second flange compared with the locking nut.

7. A device according to claim 1, wherein the first flanges are shaped like cradles on which the bearing surface and end surface face one another.

8. A device according to claim 1, wherein the O-rings are metal joints.

9. A device according to claim 1, wherein the two first O-rings are mounted in handling plates.

10. A device according to claim 1, wherein the end surfaces of the first flanges are planar and the end surfaces of the second flanges spherical.

* * * * *